United States Patent Office 3,265,717
Patented August 9, 1966

3,265,717
PENTACYCLIC STEROIDS AND PROCESS
FOR THEIR PREPARATION
James Macfarlane Allison, Derek Burn, and Vladimir
Petrow, London, England, assignors to The British Drug
Houses Limited
No Drawing. Filed Apr. 6, 1964, Ser. No. 357,790
Claims priority, application Great Britain, Apr. 10, 1963,
14,447/63
35 Claims. (Cl. 260—397.3)

This invention is for improvements in or relating to organic compounds and has particular reference to pentacyclic steroids.

It is an object of this invention to provide a novel process for building up a 6-membered carbocyclic ring onto ring D of the steroid nucleus.

It is a further object of this invention to provide new steroidal materials containing such an additional ring, which are of value on account of their biological properties, or as intermediates for the preparation of compounds having valuable biological properties e.g. glucocorticoid, anti-endotoxic and anti-inflammatory properties. In particular, this invention provides novel steroidal compounds having, apart from substituents and/or unsaturated linkages in rings A, B, C and D, the formula

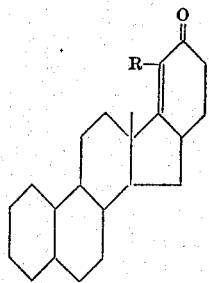

(I)

wherein R is hydrogen, an alkyl group containing up to 6 carbon atoms or an aryl group.

The compounds having the structure (I) may readily be converted, for example, into cortical hormones having a pentacyclic nucleus, which compounds are known to possess valuable biological properties (see, for example, U.S. Patent 3,070,507).

Thus, reduction of a ketone having the structure (I) yields an alcohol having the partial structure

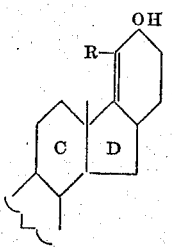

(II)

Oxidative hydroxylation of the double bond present in compound (II) where R=H leads to pentacyclic corticoids having the partial formula

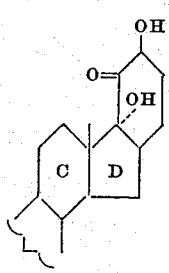

(III)

such, for example, as those described in U.S. Patent 3,070,507.

According to the present invention there is provided a process for the preparation of pentacyclic steroids having the partial formula

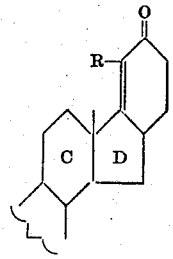

(I)

where R is hydrogen, an alkyl group containing up to 6 carbon atoms or an aryl group, which process comprises condensing a 16-substituted 17-oxo steroid of partial formula

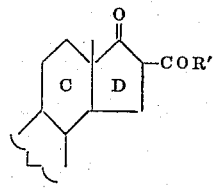

(IV)

in which R' is H or $CO_2Alk$, with methyl vinyl ketone or an analogue thereof under basic conditions to yield a 16-(3'-oxoalkyl)-17-oxo-steroid having the partial structure

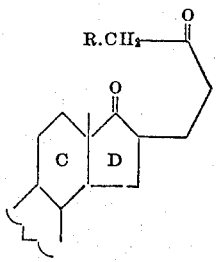

(V)

where R has the same meaning as above, and reacting the intermediate with a strong basic reagent to effect cyclisation. The condensation reaction is a typical Michael addition, and it is evident that substituted vinyl ketones, and chemical equivalents thereof (see, for example, Organic Reactions, volume X, pages 179 et seq., John Wiley & Sons Inc., New York, 1959), may be employed.

The preferred starting materials of the present invention are 16-formyl (or 16-hydroxymethylene)-17-ketosteroids (IV, R'=H). These materials are well known in prior art, and may be prepared, for example, by treating a 17-keto-steroid with methyl or ethyl formate in the presence of a basic condensation reagent such, for example, as sodium hydride or sodium methoxide (see, for example Ruzicka, Prelog and Battegay, Helv. Chim. Acta, 1948, 31, 1296). When using a 16-ethoxalyl-17-ketone having the partial structure (IV, R'=$CO_2Et$) as starting material, the 17-ketone may be treated with, for example, diethyloxalate in an analogous manner (see, for example, Ruggieri, Ferrari and Gandolfi, Gazz. Chim. Italia, 1961, 91, 672).

The 16-(3'-oxoalkyl)-17-ketone (having the partial structure V) may be prepared by treating the foregoing 16-formyl- (IV, R'=H) or 16-ethoxalyl-17-ketone (IV, R'=$CO_2Et$) with methyl vinyl ketone under basic conditions.

Thus the starting materials (IV, R'=H or CO₂Alk) may be dissolved or suspended in an inert solvent such, for example, as pyridine, tetrahydrofuran or dioxan and treated with freshly distilled methyl vinyl ketone, which may contain an oxidation inhibitor if so desired, in the presence of a basic condensing agent such, for example, as trimethylamine or triethylamine. The reaction is preferably carried out in an inert atmosphere and at a temperature in the range of 0° to 50° C. Room temperature is, however, preferred and elevated temperatures should be avoided in order to minimise too rapid loss of methyl vinyl ketone by polymerisation. Under the preferred conditions a reaction time of 1 to 5 days is satisfactory. The product may be isolated by dilution of the reaction mixture with water followed by extraction with a water immiscible solvent such as ether or benzene. The material thus obtained may, if desired, be purified by conventional means such as crystallisation or chromatography. It may however be used in the impure state for the subsequent reaction.

The cyclisation stage is carried out by treating the foregoing 16-(3'-oxobutyl)-17-oxo steroid and analogues thereof (V) with a strong basic reagent. The preferred conditions consist in treating the intermediate (V) with a 10% solution of sodium or potassium hydroxide in aqueous ethanol at the refluxing temperature of the mixture. The reaction is preferably carried out in an inert atmosphere such as nitrogen and is generally complete within ½ to 6 hours. Other water miscible solvents such as propanol or dioxan may also be used. The product may be isolated by pouring the reaction mixture into water and either filtering or extracting with a water immiscible solvent.

The foregoing reaction sequences may be applied to a wide variety of androstane and oestrane derivatives, which may be substituted and/or unsaturated in rings A, B, C and D (other than at $C_{16}$). Thus it may be applied to androstane and oestrane derivatives containing:

(a) Hydroxyl, acyloxy or alkyloxy groups, and in particular such groups at $C_1$, $C_2$, $C_3$, $C_4$, $C_5$, $C_6$, $C_7$, $C_9$, $C_{11}$, $C_{12}$, $C_{14}$, $C_{15}$, $C_{18}$ and $C_{19}$.

(b) Unsaturated linkages, and in particular such linkages at $\Delta^1$, $\Delta^2$, $\Delta^3$, $\Delta^4$, $\Delta^5$, $\Delta^6$, $\Delta^7$, $\Delta^{9(10)}$, $\Delta^{9(11)}$, $\Delta^{11}$, and combinations thereof such as $\Delta^{2,5(10)}$, $\Delta^{3,5}$, and aromatic rings such as ring A and/or ring B.

(c) Alkyl groups, and in particular methyl groups at $C_1$, $C_2$, $C_4$, $C_5$, $C_6$, $C_7$ and $C_{11}$; cycloalkyl groups and in particular cyclomethylene groups.

(d) Nitrogen substituted alkyl groups, and in particular dialkylaminomethyl groups at $C_2$, $C_3$ and $C_6$.

(e) Alkenyl, alkynyl and haloalknyl groups and in particular such groups at $C_2$, $C_3$, $C_6$ and $C_{11}$.

(f) Halogen atoms, and in particular fluorine at $C_2$, $C_3$, $C_5$, $C_6$ and $C_9$.

It will be apparent that carbonyl groups (other than at $C_{11}$) will interfere with the present process. Such carbonyl groups, for example, at $C_1$, $C_2$, $C_3$, $C_6$, $C_{12}$, must be protected by reduction to a hydroxyl group, or by conversion into a ketal, enol ether, or similar alkali-resistant group. In order to prepare a pentacyclic steroid possessing a 4-en-3-one system, it may be convenient to work with the corresponding 5-en-3-ol, and to subsequently generate the required 4-en-3-one system, for example, by oxidation. The process may also be applied to steroidal materials having additional carbocyclic or heterocyclic rings attached to, for example, ring A. Such compounds are well known to those skilled in the art and include such starting materials containing additional aromatic and heterocyclic rings attached to ring A, where the heterocyclic rings may contain nitrogen, including for example, [3,2-C]-phenyl (and substituted phenyl) pyrazoles such structures additionally containing a 6-methyl group and unsaturated linkages at $C_4$ and $C_6$ if desired, oxygen and sulphur atoms.

Following is a description by way of example of methods of carrying the invention into effect.

The following nomenclature is adopted in the examples. The saturated pentacyclic steroid nucleus has been given the trivial name "pentarame," with the numbering shown in the diagram. The usual rules of steroid nomenclature are followed.

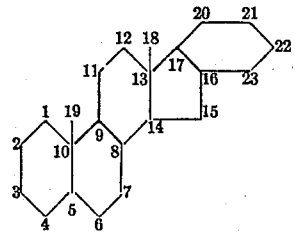

EXAMPLE 1

*Preparation of 3β-hydroxypentara-5,17(20)-dien-21-one*

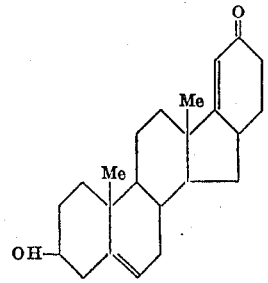

A solution of 3β-hydroxyandrost-5-en-17-one (100 g.) and ethyl formate (100 ml.) in dry benzene (100 ml.) was stirred with sodium methoxide (prepared from 24 g. of sodium) at room temperature, under nitrogen, for 1 hour. The mixture was then refluxed for 1½ hours, cooled and poured into water (ca. 5000 ml.). The organic layer was separated and the aqueous layer was acidified with dilute sulphuric acid and the resulting precipitate was collected, washed with water and dried. The product 16-formyl-3β-hydroxy-androst-5-en-17-one had M.P. 244–247° C.

A suspension of the above product (70 g.) in dry pyridine (700 ml.) containing triethylamine (20 ml.) and methyl vinyl ketone (50 ml., stabilised with a trace of hydroquinone) was stirred at room temperature under nitrogen for 3 days, during which time the suspended solid had dissolved. The solvent was removed under reduced pressure and the residue was chromatographed on alumina (800 g.) in benzene. Elution with benzene: ether (1:1) gave 3β-hydroxy-16-(3'-oxobutyl)-androst-5-en-17-one, prisms from acetone, M.P. 156–156.5° C., $[\alpha]_D^{21}$ +11.7° (c., 1.0 in chloroform).

A solution of the foregoing product (14.5 g.) and potassium hydroxide (50 g.) in ethanol (250 ml.) and water (250 ml.) was refluxed under nitrogen for 5½ hours. The solid obtained on pouring the solution into water was crystallised from acetone to give 3β-hydroxypentara-5, 17(20)-dien-21-one as needles, M.P. 191.5–192° C., $[\alpha]_D^{23}$ —97.4° (c., 1.1 in chloroform), $$\lambda_{max.}^{EtOH} \ 237 \ m\mu \ (\epsilon \ 16,260)$$

The compound had claudogenic properties. The 3β-acetate, prepared with acetic anhydride and pyridine, crystallised from aqueous methanol as needles, M.P. 206.5–207.5° C., $[\alpha]_D^{25}$ —107° (c., 1.0 in chloroform), $$\lambda_{max.}^{EtOH} \ 236 \ m\mu \ (\epsilon \ 16,980)$$

The 21-oxime, prepared with hydroxylamine hydrochloride in ethanol and pyridine, crystallised from chloroform-methanol as rods, M.P. 240° C. (decomp.), $[\alpha]_D^{22}$ —160° (c., 0.3 in chloroform). It had C.N.S. properties.

The 3β,21-diacetate was prepared by reducing 3β-hydroxypentara-5,17(20)-dien-21-one with sodium borohydride in ethanol, acetylating the alcohol (M.P. 204–206° C.) with acetic anhydride in pyridine and chromatographing the acetate on alumina. It crystallised from methanol as needles, M.P. 161.5° C., $[\alpha]_D^{23}$ —144.6° (c., 0.8 in chloroform).

Pentara-4,17(20)-dien-3,21-dione, prepared by Oppenauer oxidation of 3β-hydroxypentara-5,17(20)-dien-21-one, crystallised from acetone-hexane as needles, M.P. 205.5 —206° C., $[\alpha]_D^{22}$ +70° C. (c., 1.0 in chloroform), $$\lambda_{max.}^{EtOH}\ 238\ m\mu,\ (\epsilon\ 34,270)$$

It had claudogenic properties.

EXAMPLE 2

Preparation of 3β-hydroxy-6-methylpentara-5,17(20)-dien-21-one

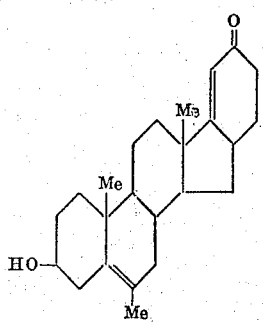

A solution of 3β-hydroxy-6-methylandrost-5-en-17-one (5 g.) and ethyl formate (10 ml.) in dry benzene (100 ml.) was stirred with sodium methoxide (prepared from 2.5 g. of sodium) at room temperature, under nitrogen, for 1 hour. The mixture was then refluxed for 1 hour, cooled, and poured into water. The organic phase was separated, the aqueous phase was acidified with dilute sulphuric acid, and the resulting precipitate was collected, washed with water and dried. The product 16-formyl-3β-hydroxy-6-methyl-androst-5-en-17-one had M.P. 214–216° C.

A suspension of the above product (5 g.) in dry pyridine (75 ml.) containing triethylamine (2.5 ml.) and methyl vinyl ketone (7.5 ml.) was stirred at room temperature, under nitrogen, for 4 days, during which time the solid had dissolved. The solvent was removed under reduced pressure and the residue was chromatographed on alumina in benzene. Elution with benzene:ether (1:1) gave 3β - hydroxy - 6 - methyl - 16 - (3' - oxobutyl)-androst-5-en-17-one, needles from acetone-hexane, M.P. 130–131° C. It had claudogenic activity.

A solution of the foregoing compound (3.8 g.) and potassium hydroxide (15 g.) in ethanol (75 ml.) and water (75 ml.) was refluxed under nitrogen for 6 hours. The solution was poured into water and the organic material was extracted into ether. Evaporation of the washed and dried extract gave a gum which was crystallised from acetone to give 3β-hydroxy-6-methylpentara-5,17(20)-dien-21-one as plates, M.P. 196–197.5° C., $[\alpha]_D^{24}$ —129.7 (c., 1.0 in chloroform), $$\lambda_{max.}^{EtOH}\ 236\ m\mu\ (\epsilon\ 17,000)$$

It had claudogenic activity.

The 3β-acetate, prepared with acetic anhydride and pyridine, crystallised from aqueous methanol as plates M.P. 182–182.5° C., $[\alpha]_D^{23}$ —111.5° (c., 1.0 in chloroform), $$\lambda_{max.}^{EtOH}\ 236\ m\mu\ (\epsilon\ 17,740)$$

6α-methylpentara-4,17(20)-diene-3,21-dione was prepared by Oppenauer oxidation of the foregoing 3β-hydroxy-6-methylpentara-5,17(20)-dien-21-one. It crystallised from acetone-hexane as blades, M.P. 192.5–193° C., $[\alpha]_D^{24}$ +41° (c., 0.6 in chloroform), $$\lambda_{max.}^{EtOH}\ 238\ m\mu\ (\epsilon\ 27,740)$$

It had C.N.S. and claudogenic properties.

EXAMPLE 3

Preparation of 11β-hydroxypentara-4,17(20)-diene-3,21-dione

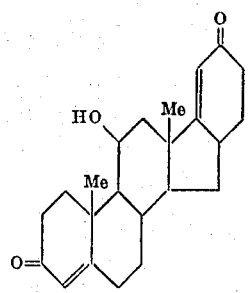

3,3-ethylenedioxy-11β-hydroxyandrost-5-en-17-one was prepared by reducing the 3-ketal of cortisone acetate with sodium borohydride under vigorous conditions and oxidising the product with sodium metaperiodate. It crystallised from aqueous methanol containing a trace of pyridine as needles, M.P. 214–214.5° C., $[\alpha]_D^{22}$ +14° (c., 1.0 in dioxan).

The foregoing product was treated with ethyl formate and sodium methoxide as described in Example 1. The product 3,3-ethylenedioxy-16-formyl-11-hydroxy-androst-5-en-17-one, had M.P. 231–233° C. (decomp.).

The last compound was treated with methyl vinyl ketone as described in Example 1. Chromatography of the product gave 3,3-ethylenedioxy-11β-hydroxy-16-(3'-oxobutyl)-androst-5-en-17-one, as needles from acetone-hexane, M.P. 173.5–174° C., $[\alpha]_D^{22}$ +7.4° (c., 0.75 in chloroform).

3,3-ethylenedioxy - 11β - hydroxy - 16 - (3' - oxobutyl)-androst-5-en-17-one was treated with aqueous alcoholic potassium hydroxide as described in Example 1. The product which separated was crystallised from methylene chloride-acetone (containing a trace of pyridine) to give 3,3 - ethylenedioxy - 11β - hydroxypentara - 5,17(20)-dien-21-one as plates, M.P. 241–241.5° C., $[\alpha]_D^{22}$ —108.4° (c., 1.05 in chloroform), $$\lambda_{max.}^{EtOH}\ 237\ m\mu\ (\epsilon\ 11,500)$$

Treatment of the foregoing compound with aqueous acetic acid gave 11β-hydroxypentara-4,17(20)-diene-3,21-dione, rods from acetone-hexane, M.P. 233° C., $[\alpha]_D^{19}$ +57.4° (c., 0.85 in chloroform), $$\lambda_{max.}^{EtOH}\ 239\ m\mu\ (\epsilon\ 33,300)$$

The compound had claudogenic, C.N.S. and glucocorticoid properties.

EXAMPLE 4

Preparation of pentara-4,17(20)-diene-3,11,21-trione 3,3 - ethylenedioxyandrost - 5 - ene - 11,17 - dione was prepared by reducing cortisone acetate 3-ketal with sodium borohydride under mild conditions and oxidising the product with sodium metaperiodate.

It was treated successively with ethylformate and sodium methoxide, methyl vinyl ketone and finally, aqueous alcoholic potassium hydroxide as described in Example 1.

Deketalisation of the product with aqueous acetic acid gave pentara-4,17(20)-diene-3,11,21-trione as prisms from acetone, M.P. 243–246° C., $[\alpha]_D^{22}$ +104° (c., 0.75 in chloroform), $\lambda_{max.}^{EtOH}$ 236 mμ (ε 31,900)

The compound had claudogenic and glucocorticoid properties.

EXAMPLE 5

Preparation of 11α-hydroxypentara-4,17(20)-diene-3,21-dione

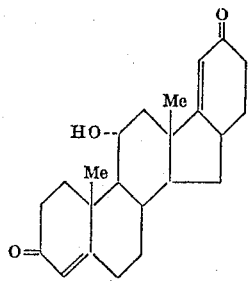

3,3-ethylenedioxy - 11α-hydroxyandrost - 5-en-17-one was prepared by reducing 11-epicortisol acetate 3-ketal with sodium borohydride and oxidising the product with sodium metaperiodate. It was treated successively with ethyl formate and sodium methoxide, methyl vinyl ketone and aqueous alcoholic potassium hydroxide as described in Example 1. Deketalisation of the product with aqueous acetic acid gave 11α-hydroxypentara-4,17(20)-diene-3,21-dione. M.P. 227–231° C., $[\alpha]_D$ —18.5° C., $\lambda_{max.}$ 241 mμ (ε28,390).

EXAMPLE 6

Preparation of 3-methoxypentara-3,5,17(20)-trien-21-one

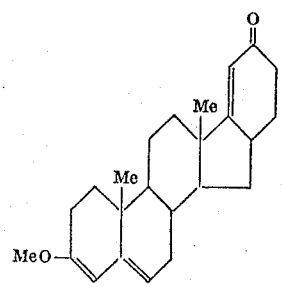

The 3-methyl enol ether of androst-4-ene-3,17-dione was treated successively with ethyl-formate/sodium methoxide and methyl vinyl ketone as described in Example 1. The product crystallised from methylene chloride-methanol (containing a few drops of pyridine) to give 3-methoxy-16-(3'-oxobutyl)-androsta-3,5-dien-17-one as blades, M.P. 135–137° C., $[\alpha]_D^{23}$ —63.2° (c., 1.5 in chloroform), $\lambda_{max.}^{EtOH}$ 240 mμ (ε 19,340)

The foregoing product (4.2 g.) and potassium hydroxide (13 g.) in ethanol (100 ml.) and water (40 ml.) were refluxed under nitrogen for 2 hours. The precipitated solid was collected and crystallised from methylene chloride-methanol (containing a trace of pyridine). 3-methoxypentara-3,5,17(20)-trien-21-one formed plates, M.P. 227–230° C., $[\alpha]_D^{25}$ —271° (c., 1.8 cholorform), $\lambda_{max.}^{EtOH}$ 239 mμ (ε 35,110)

Treatment of the foregoing material with aqueous acetic acid gave pentara-4,17(20)-diene-3,21-dione, M.P. 205–207° C., identical with that obtained in Example 1.

EXAMPLE 7

Preparation of 3β-hydroxy-20-methylpentara-5,17(20)-dien-21-one

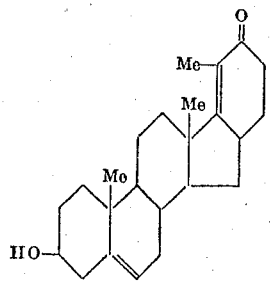

The process of Example 1 was repeated, substituting ethyl vinyl ketone for methyl vinyl ketone. The product crystallised from methylene chloride-acetone to give 3β-hydroxy - 20 - methylpentara - 5,17(20) - dien-21-one as prisms, M.P. 244–246° C., $[\alpha]_D^{23}$ —42.6° (c., 0.7 in chloroform), $\lambda_{max.}^{EtOH}$ 250 mμ (ε 18,290)

EXAMPLE 8

Preparation of 2α-methylpentara-4,17(20)-diene-3,21-dione

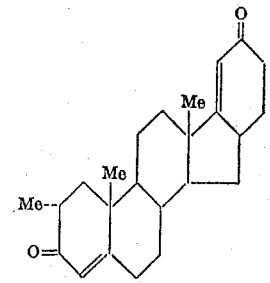

The process of Example 1 employing successively ethyl formate/sodium methoxide, methyl vinyl ketone and aqueous alcoholic potassium hydroxide was applied to 3,3-ethylenedioxy-2α-methylandrost-5-en-17-one, to yield, after deketalisation with dilute aqueous acetic acid, 2α-methylpentara-4,17(20)-diene-3,21-dione, having $\lambda_{max.}^{EtOH}$ 239 mμ (ε 34,000)

EXAMPLE 9

Preparation of 4-methylpentara-4,17(20)-diene-3,21-dione

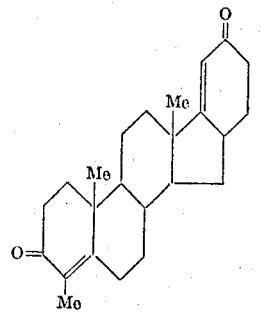

The process of Example 1 employing successively ethyl formate/sodium methoxide, methyl vinyl ketone and aqueous alcoholic potassium hydroxide was applied to 3,3-ethylenedioxy-4-methylandrost-4-en-17-one to give, after deketalisation, 4-methylpentara-4,17(20)-diene-3,21-dione, having $\lambda_{max.}^{EtOH}$ 246 mμ (ε 30,000)

EXAMPLE 10

*Preparation of 6-fluoro-3β-hydroxypentara-5,17(20)-dien-21-one*

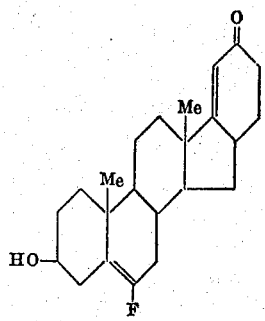

The process of Example 1 employing successively ethyl formate/sodium methoxide, methyl vinyl ketone and aqueous alcoholic potassium hydroxide was applied to 6-fluoro-3β-hydroxyandrost-5-en-17-one and gave 6-fluoro-3β-hydroxypentara-5,17(20)-dien-21-one, $\lambda_{max.}^{EtOH}$ 238 mμ ($\epsilon$ 16,000)

EXAMPLE 11

*Preparation of 3-methoxy-6-methylpentara-3,5,17(20)-trien-21-one*

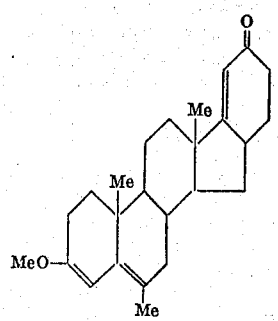

The process of Example 1 employing successively ethyl formate/sodium methoxide, methyl vinyl ketone and aqueous alcoholic potassium hydroxide was applied to 3-methoxy-6-methylandrosta-3,5-dien-17-one and gave 3-methoxy-6-methylpentara-3,5,17,(20)-trien-21-one, having $\lambda_{max.}^{EtOH}$ 245 mμ ($\epsilon$ 29,500)

Hydolysis with dilute aqueous alcoholic hydrochloric acid gave 6α-methylpentara-4,17(20)-diene-3,21-dione, M.P. 192–193° C., identical with that prepared in Example 2.

EXAMPLE 12

*Preparation of 6-dimethylaminomethyl-3-methoxypentara-3,5,17(20)-trien-21-one*

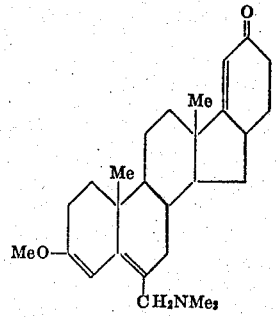

The process of Example 1 employing successively ethyl formate/sodium methoxide, methyl vinyl ketone and aqueous alcoholic potassium hydroxide was applied to 6-dimethylaminomethyl-3-methoxyandrosta-3,5-dien-17-one and gave 6-dimethylaminomethyl-3-methoxypentara-3,5,17(20)-trien-21-one having $\lambda_{max.}^{EtOH}$ 246 mμ ($\epsilon$ 31,000)

EXAMPLE 13

*Preparation of 3β-hydroxypentara-5,9,(11),17(20)-trien-21-one*

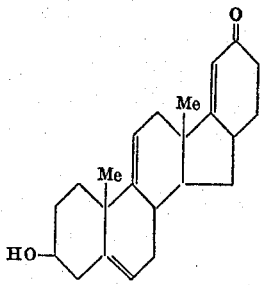

The process of Example 1 employing successively ethyl formate/sodium methoxide, methyl vinyl ketone and aqueous alcoholic potassium hydroxide was applied to 3β-hydroxyandrosta-5,9(11)-dien-17-one and gave 3β-hydroxypentara-5,9(11),17(20)-trien-21-one having $\lambda_{max.}^{EtOH}$ 237 mμ ($\epsilon$ 16,250)

EXAMPLE 14

*Preparation of 3-methoxy-19-norpentara-1,3,5(10)17(20)-tetraen-21-one*

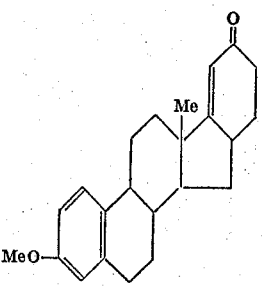

The process of Example 1 employing successively ethyl formate/sodium methoxide, methyl vinyl ketone and aqueous alcoholic potassium hydroxide was applied to the methyl ether of oestrone and gave 3-methoxy-19-norpentara-1,3,5(10),17,(20)-tetraen-21-one having $\lambda_{max.}^{EtOH}$ M.P. 241.5–242° C., [α]$_D$—4.0 (c., 0.88), λ$_{max.}$ 234 mμ ($\epsilon$ 24,390). The compound is of value on account of its claudogenic properties.

EXAMPLE 15

*Preparation of pentara-1,4,17(20)-triene-3,21-dione*

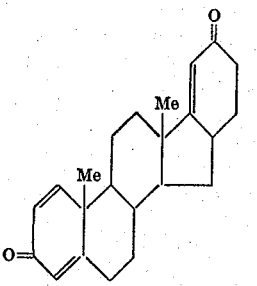

A solution of 3β-hydroxy-16-[3′-oxobutyl]-androst-5-en-17-one (prepared as described in Example 1) (4.40 g.) in Analar acetone was flushed out with nitrogen and treated with chromium trioxide/sulphuric acid reagent (5.8 ml.) at 0° C. for 3 minutes then poured into water and filtered giving a white solid (3.2 g.). Crystallisation from acetone/hexane gave 16-(3′-oxobutyl)-androst-5-ene3,17-dione, M.P. 134–135° C.[α]$_D$+43° (c., 0.76).

A solution of the above compound (3.0 g.) in methanol (60 ml.) was treated with 5% potassium hydroxide solution (0.1 ml.) and boiled on the steam bath for 15 minutes. Acetic acid (0.4 ml.) was added and the solution was evaporated to 20 ml. then water was added giving a yellow solid (1.60 g.). Crystallisation from acetone/hexane gave 16-(3'-oxobutyl)-androst-4-ene-3,17-dione as blades, M.P. 162–164° C., $[\alpha]_D^{25}$ +148 (c., 0.87) $\lambda_{max.}$ 240 m$\mu$ ($\epsilon$ 16,400).

A solution of the foregoing $\Delta^4$-3-ketone (1.0 g.) and dichlorodicyanoquinone (1.0 g.) in dioxan (40 ml.) was refluxed for 6 hours. The product was isolated in the usual way and crystallised from acetone/hexane to give 16 - (3' - oxobutyl)-androsta-1,4-diene-3,17-dione, $\lambda_{max.}$ 243 m$\mu$ ($\epsilon$, 14,500).

A solution of the foregoing 16-(3'-oxobutyl)-compound (250 mg.) and potassium hydroxide (480 mg.) in ethanol (3 ml.) and water (3 ml.) was refluxed under nitrogen for 30 minutes. The product was isolated with ether and purified by filtration through alumina followed by crystallisation from acetone/hexane to give penetara-1,4,17-(20)-triene-2,21-dione, $\lambda_{max.}$ 238 m$\mu$ ($\epsilon$, 28,500).

EXAMPLE 16

Preparation of 11$\beta$-hydroxypentara-1,4,17(20)-triene-3,21-dione

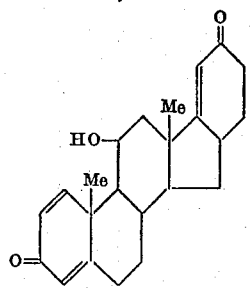

3,3 - ethylenedioxy - 11$\beta$ - hydroxy-16-(3'-oxobutyl)-androst-5-en-17-one (prepared as described in Example 3) was deketalised by means of aqueous acetic acid giving 11$\beta$ - hydroxy - 16 - (3'-oxobutyl)-androst-4-ene-3,17-dione from acetone/hexane as prisms, M.P. 174° C., $[\alpha]_D^{24}$+160.4° (c., 1.70), $\lambda_{max.}$ 241 m$\mu$ ($\epsilon$ 16,020).

A solution of the latter compound (1.30 g.) in dioxan (50 ml.) was treated with dichlorodicyanoquinone (1.00 g.) and refluxed for 6 hours. Isolation of the product in the usual way followed by crystallisation from acetone/hexane gave 11$\beta$-hydroxy-16-(3'-oxobutyl)-androsta-1,4-diene-3,17-dione as needles, M.P. 226.5° C., $[\alpha]_D^{29}$ +85.2° (c., 0.99), $\lambda_{max.}$ 242 m$\mu$ ($\epsilon$ 14,264).

A solution of the foregoing compound (0.94 g.) and potassium hydroxide (2.5 g.) in ethanol (20 ml.) and water (15 ml.) was refluxed under nitrogen for 30 minutes, diluted with water, and isolated by means of ether. The organic phase was washed with water, dried and evaporated to dryness. Crystallisation of the gummy residue from acetone/hexane gave 11$\beta$-hydroxypentara-1,4,17(20)-triene-3,21-dione as blades, M.P. 208.5–209° C., $[\alpha]_D^{28}$+15.8° (c., 1.00) $\lambda_{max.}$ 238 m$\mu$ ($\epsilon$ 28,700).

EXAMPLE 17

Preparation of 11$\beta$-hydroxypentara-4,6,17(20)-triene-3,21-dione

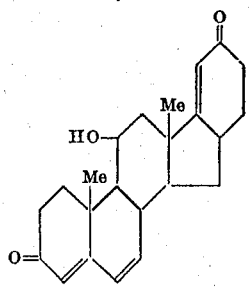

A solution of 11$\beta$-hydroxy-16-(3'-oxobutyl)-androst-4-ene-3,17-dione (prepared as described in Example 16) (2.00 g.) in dry t-butanol (50 ml.) was treated with chloranil (5.00 g.) and refluxed with stirring for 3 hours. The reaction mixture was cooled, excess chloranil was filtered off, washed with ether and the filtrate evaporated to dryness. The gummy residue was dissolved in ether which was then washed with dilute aqueous potassium hydroxide, water, dried and evaporated giving a pale yellow crystalline solid which was crystallised from acetone/hexane to give 11$\beta$-hydroxy-16-(3'-oxobutyl)-androsta-4,6-diene-3,17-dione as needles, M.P. 221–221.5° C., $[\alpha]_D$÷133.6° (c., 0.79), $\lambda_{max.}$ 282 m$\mu$ ($\epsilon$ 24,400).

A solution of the above compound (970 mg.) and potassium hydroxide (1.80 g.) in ethanol (10 ml.) and water (10 ml.) was refluxed under N$_2$ for 30 minutes. The product began to crystallise from the reaction mixture after 10 minutes. After 30 minutes the reaction mixture was cooled to 0° C. and the crystalline product filtered off and washed thoroughly with water, dried and crystallised from acetone to give 11$\beta$-hydroxypentara-4,6,17(20)-triene-3,21-dione as needles, M.P. 263.5–264° C., $[\alpha]_D^{25}$—44.4° (c., 1.02), $\lambda_{max.}$ 237 m$\mu$ ($\epsilon$ 16,200), $\lambda_{max.}$ 280 m$\mu$ ($\epsilon$ 22,700).

EXAMPLE 18

Preparation of 3$\alpha$,11$\beta$-dihydroxy-5$\beta$-pentar-17(20)-en-21-one

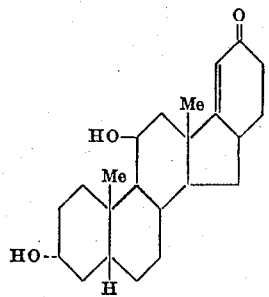

A mixture of sodium methoxide (from 12 g. of sodium), ethyl formate (25 ml.), 3$\alpha$,11$\beta$-dihydroxy-5$\beta$-androstan-17-one (Harnik, J. Org. Chem. 1936, 28, 3386) (25 g.) and benzene (100 ml.) was stirred under nitrogen for 1 hour at room temperature and then refluxed for 1 hour. The reaction mixture was cooled, diluted with water and the benzene layer separated. The aqueous phase was extracted with ether and then acidified with dilute sulphuric acid. The precipitated 3$\alpha$,11$\beta$-dihydroxy-16-hydroxymethylene-5$\beta$-androstan-17-one was filtered, washed thoroughly with water, dried and used directly for the next stage of the synthesis.

A mixture of the foregoing 16-hydroxymethylene compound (22 g.), methyl vinyl ketone (20 ml.), pyridine (200 ml.) and triethylamine (10 ml.) was kept overnight at room temperature in a nitrogen atmosphere. Evaporation of the solvent under reduced pressure gave a gummy residue which was dissolved in benzene and chromatographed on alumina giving 3$\alpha$,11$\beta$-dihydroxy-16-(3'-oxobutyl)-5$\beta$-androstan-17-one.

A solution of the foregoing 16-(3'-oxobutyl) compound (10 g.) and potassium hydroxide (20 g.) in ethanol (100 ml.) and water (100 ml.) was refluxed under nitrogen for 30 minutes. This solution was cooled and the product precipitated with water was filtered and washed thoroughly with water giving 3$\alpha$,11$\beta$-dihydroxy-5$\beta$-pentar-17(20)-en-21-one, $\lambda_{max.}$ 237 m$\mu$ ($\epsilon$ 16,600).

EXAMPLE 19

*Preparation of 3β,11β-dihydroxy-5α-pentar-17(20)-en-21-one*

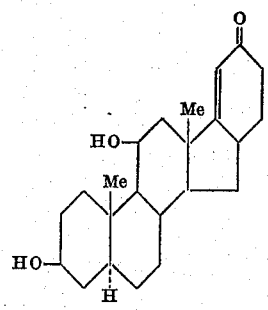

A mixture of sodium methoxide (from 14 g. of sodium), ethyl formate (30 ml.), 3β,11β-dihydroxy-5α-androstan-17-one (30 g.) and benzene (120 ml.) was stirred at room temperature for 1 hour and then refluxed for 1 hour. The reaction mixture was cooled, diluted with water and the benzene layer separated. The aqueous phase was extracted with ether and then acidified with dilute sulphuric acid. The precipitated 3β,11β-dihydroxy-16-hydroxymethylene-5α-androstan-17-one was filtered, washed with water, dried and used without purification for the next stage of the synthesis.

A mixture of the foregoing 16-hydroxymethylene compound (24 g.), methyl vinyl ketone (20 ml.), pyridine (250 ml.) and triethylamine (12 ml.) was kept overnight at room temperature in a nitrogen atmosphere. Evaporation of the solvent under reduced pressure gave a gummy residue which was dissolved in benzene and chromatographed on alumina to give 3β,11β-dihydroxy-16-(3'-oxobutyl)-5α-androstan-17-one.

A solution of the foregoing 16-(3'-oxobutyl) compound (15 g.) and potassium hydroxide (30 g.) in ethanol (150 ml.) and water (150 ml.) was refluxed under nitrogen for 30 minutes. The solution was cooled and the product, precipitated with water, was filtered and washed thoroughly with water to give 3β,11β-dihydroxy-5α-pentar-17(20)-en-21-one, $\lambda_{max}$ 237 mμ (ε 16,750).

EXAMPLE 20

*Preparation of 11β-hydroxy-5β-pentar-17(20)-ene-3,21-dione*

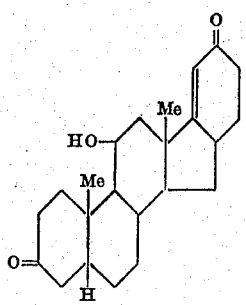

A mixture of sodium methoxide (from 5 g. of sodium), ethyl formate (12 ml.), 3,3-ethylenedioxy-11β-hydroxy-5β-androstan-17-one (12 g.) and benzene (100 ml.) was stirred at room temperature for 1 hour, then refluxed for 1 hour. The reaction mixture was cooled, diluted with water and the benzene layer separated. The aqueous phase was extracted with ether and then treated with sodium acetate (5 g.) and cautiously acidified with 50% acetic acid. The precipitated 3,3-ethylenedioxy-11β-hydroxy-16-hydroxymethylene-5β-androstan-17-one was filtered, washed, dried and used without purification for the next reaction.

A mixture of the foregoing 16-hydroxymethylene compound (9 g.), methyl vinyl ketone (10 ml.), pyridine (100 ml.) and triethylamine (3 ml.) was kept overnight at room temperature in a nitrogen atmosphere. Evaporation of the solvent under reduced pressure yielded a gummy residue which was dissolved in benzene and chromatographed on alumina to give 3,3-ethylenedioxy-11β-hydroxy-16-(3'-oxobutyl)-5β-androstan-17-one.

A solution of the foregoing product (4 g.) and potassium hydroxide (8 g.) in ethanol (40 ml.) and water (40 ml.) was refluxed under nitrogen for 30 minutes. The solution was cooled and the product, precipitated with water, was collected, washed with water and dried.

The crude product (3.5 g.) from the previous reaction was treated with aqueous acetic acid (75%, 25 ml.) at 100° C. for 30 minutes. The product, 11β-hydroxy-5β-pentar-17(20)-ene-3,21-dione, was precipitated with water, filtered, washed with water, dried and crystallised from acetone/hexane as blades, M.P. 216.5–217° C., $[\alpha]_D^{24}$ —3.5° (c., 1.05), $\lambda_{max.}$ 236.5 mμ (ε, 16,900).

EXAMPLE 21

*Preparation of 11β-hydroxy-5α-pentar-17(20)-ene-3,21-dione*

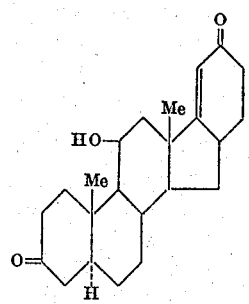

A mixture of sodium methoxide (from 10 g. of sodium), ethyl formate (25 ml.), 3,3-ethylenedioxy-11β-hydroxy-5α-androstan-17-one (25 g.) and benzene (250 ml.) was stirred at room temperature for 1 hour then refluxed for 1 hour. The reaction mixture was cooled, diluted with ether and the benzene layer was separated. After extracting the aqueous phase with ether it was cautiously acidified with 50% aqueous acetic acid. The precipitated 3,3-ethylenedioxy - 11β - hydroxy - 16 - hydroxymethylene - 5α-androstan-17-one was filtered, washed, dried and used without purification for the next reaction.

A mixture of the foregoing 16-hydroxymethylene compound (21 g.), methyl vinyl ketone (20 ml.), pyridine (200 ml.) and triethylamine (8 ml.) was kept overnight at room temperature in a nitrogen atmosphere. Evaporation of the solvents under reduced pressure yielded a gummy residue which was dissolved in benzene and chromatographed on alumina to give 3,3-ethylenedioxy-11β-hydroxy-16-(3'-oxobutyl)-5α-androstan-17-one.

A solution of the foregoing product (9 g.) and potassium hydroxide (18 g.) in ethanol (100 ml.) and water (100 ml.) was refluxed under nitrogen for 30 minutes. The solution was cooled and the product, precipitated with water, was collected, washed with water and dried giving 3,3-ethylenedioxy-11β-hydroxy-5α-pentar-17(20) - en-21-one.

The crude product (7.5 g.) from the previous reaction was treated with aqueous acetic acid (75%, 50 ml.) at 100° C. for 30 minutes. Precipitation with water gave a crystalline solid, 11β-hydroxy-5α-pentar-17(20)-ene-3,21-dione, which was washed with water, dried and crystallised from acetone/hexane, M.P. 224–225° C., $[\alpha]_D$ −12.7 (c., 1.02), $\lambda_{max.}$ 236.5 (ε, 17,700).

EXAMPLE 22

*Preparation of 6-formyl-11β-hydroxy-3-methoxy-pentara-3,5,17(20)-trien-21-one*

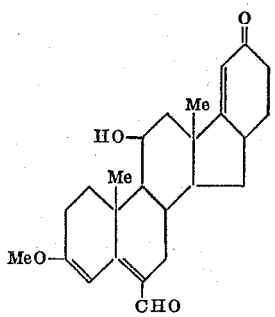

A solution of 11β-hydroxy-3-methoxyandrosta-3,5-dien-17-one (9.15 g.) in methylene chloride (60 ml.) and pyridine (1.5 ml.) was added to a solution of the Vilsmeier complex prepared at 0° C. from phosphorus oxychloride (9.8 ml.) in methylene chloride (45 ml.) and dimethyl formamide (30 ml.) in methylene chloride (50 ml.). After 1 hour at 0° C. the reaction mixture was stirred vigorously with aqueous sodium acetate (10%, 500 ml.) for 20 minutes then the product was isolated by means of ether. The product, a gummy solid, was suspended in methanol (200 ml.), treated with potassium hydroxide (2.5 g.) in water (20 ml.) and stirred at room temperature overnight. The product was precipitated with water, filtered, washed with water, dried, and crystallised from methylene chloride/methanol to give 6-formyl-11β-hydroxy-3-methoxyandrosta-3,5-dien-17-one as prisms, M.P. 217° C., $[\alpha]_D^{25}$ −30° (c., 1.01) (CHCl₃), $\lambda_{max.}$ 219 mμ (ε, 10,100) $\lambda_{max.}$ 323 mμ (ε, 15,800).

A mixture of soduim methoxide (from 1.7 g. sodium), the foregoing compound (4.00 g.), ethyl formate (5 ml.) and benzene (125 ml.) was stirred at room temperature overnight under nitrogen. The reaction mixture was diluted with water and the aqueous phase separated and acidified with 50% acetic acid. The precipitated 16-hydroxymethylene derivative was collected, washed with water, dried and used directly for the following reaction.

A mixture of the 16-hydroxymethylene compound (1.8 g.), methyl vinyl ketone (1.4 ml.), pyridine (20 ml.) and triethylamine (0.7 ml.) was stirred at room temperature overnight under a nitrogen atmosphere. Evaporation of the solvents under vacuum gave a gummy residue which was dissolved in benzene and chromatographed on alumina (30 g.) to give 6-formyl-11β-hydroxy-3-methoxy-16-(3′-oxobutyl)-androsta-3,5-dien-17-one, M.P. 211.5° C., $[\alpha]_D$ −19.2° (c., 0.28), $\lambda_{max.}$ 219.5 mμ (ε 10,300), $\lambda_{max.}$ 323 mμ (ε 16,000).

A solution of the foregoing 16-(3′-oxobutyl)-compound (60 mg.) and potassium hydroxide (1 g.) in ethanol (7 ml.) and water (3 ml.) was refluxed for 20 minutes under nitrogen. Precipitation with water gave a gummy solid which was filtered, washed with water, dried, dissolved in benzene and filtered through alumina. Crystallisation of the product from methanol gave 6-formyl-11β-hydroxy-3-methoxypentara-3,5,17(20)-trien-21-one, as needles, M.P. 267-268° C., $[\alpha]_D^{26}$ −184.5° (c., 0.52), $\lambda_{max.}$ 238 mμ (ε 23,400), $\lambda_{max.}$ 322 mμ (ε 16,800).

EXAMPLE 23

*Preparation of 6-cyano-11β-hydroxy-3-methoxypentara-3,5,17(20)-trien-21-one*

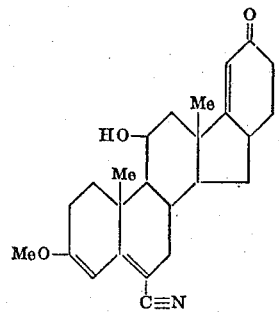

A suspension of 6-formyl-11β-hydroxy-3-methoxyandrosta-3,5-dien-17-one (5.6 g.) in methanol (100 ml.) was treated with a solution of hydroxylamine hydrochloride (1.15 g.) and sodium acetate (2.5 g.) in water (10 ml.) and stirred at room temperature for 1½ hours. Water (20 ml.) was added and the product filtered, washed with water, and crystallised from aqueous methanol to give 11β-hydroxy - 6 - hydroxyiminomethyl-3-methoxyandrosta-3,5-dien-17-one, as plates, M.P. 165–167° C., $[\alpha]_D^{26}$ −86.2° (c., 0.52), $\lambda_{max.}$ 216.5 mμ (ε 8,480), $\lambda_{max.}$ 295 mμ (ε 19,600).

The foregoing oxime (5.6 g.) was acetylated with pyridine (20 ml.) and acetic anhydride (10 ml.) at room temperature overnight. The product was isolated with ether and the ether washed with dilute hydrochloric acid, water, dilute bicarbonate solution, water, dried and evaporated to dryness. The resultant gummy residue was heated on an oil bath at 175° C. for 3 minutes under nitrogen. On cooling, the product crystallised and was purified from methanol to give 6-cyano-11β-hydroxy-3-methoxyandrosta-3,5-dien-17-one, as rods, M.P. 253° C., $[\alpha]_D^{25}$ −23.6° (c., 0.65) $\lambda_{max.}$ 282 mμ (ε 19,600).

A mixture of sodium methoxide (from 2 g. of sodium), the foregoing compound (4 g.) ethyl formate (4 ml.) and benzene (40 ml.) was stirred at room temperature overnight. The reaction mixture was diluted with water and the aqueous phase acidified with 50% aqueous acetic acid. The precipitated 6-cyano-11β-hydroxy-16-hydroxymethylene-3-methoxyandrosta-3,5 - dien - 17 - one was filtered, washed with water, dried, and used without further purification for the next reaction.

A solution of the foregoing 16-hydroxymethylene compound (2.60 g.) in pyridine (30 ml.) was treated with methyl vinyl ketone (1.5 ml.) and triethylamine (2 ml.) under nitrogen for 7 hours at room temperature. Evaporation of the solvents gave a brown gum which was dissolved in benzene and chromatographed on alumina to give 6 - cyano - 11β-hydroxy-3-methoxy-16-(3′-oxobutyl)-androsta-3-5-dien-17-one, crystallised from methanol as needles, M.P. 250° C., $[\alpha]_D^{25}$ −14.4° (c., 0.40) $\lambda_{max.}$ 282 mμ (ε 19,700).

A solution of the foregoing 16-oxobutyl compound (550 mg.) and potassium hydroxide (1.75 g.) in ethanol (20 ml.), benzene (5 ml.) and water (5 ml.) was refluxed under nitrogen for 20 minutes. The condenser was removed and the benzene allowed to boil off. The reaction mixture was cooled and the crystalline precipitate filtered, washed with water, dried, and crystallised from chloroform/methanol to give 6-cyano-11β-hydroxy-3-methoxypentara-3,5,17(20)-trien-21-one as plates, M.P. 307–309° C. (uncorrected), $[\alpha]_D$ −165° (c., 0.43), $\lambda_{max.}$ 235 mμ (ε 18,600), $\lambda_{max.}$ 282 mμ (ε 20,200).

EXAMPLE 24

Preparation of 6α-chloro-11β-hydroxypentara-4,17(20)-diene-3,21-dione

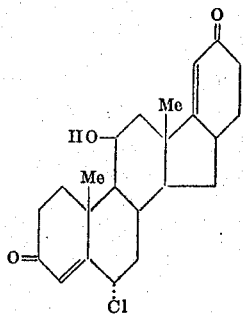

A mixture of sodium methoxide (from 4 g. of sodium), ethyl formate (8.5 ml.), 6-chloro-11β-hydroxy-3-methoxyandrosta-3,5-dien-17-one (8.5 g.) and benzene (85 ml.) was stirred under nitrogen for 1 hour at room temperature and then refluxed for 1 hour. Water was added to dissolve the precipitated solid and the aqueous solution was separated. After the addition of excess 30% aqueous sodium acetate, the stirred solution was neutralised by the dropwise addition of acetic acid and the precipitated 6 - chloro - 16 - formyl - 11β - hydroxy - 3 - methoxyandrosta-3,5-dien-17-one was collected by filtration, washed with water and dried.

A mixture of the foregoing compound (2.4 g.), freshly distilled methyl vinyl ketone (2.6 ml.), pyridine (30 ml.) and triethylamine (1 ml.) was kept overnight at room temperature in a nitrogen atmosphere. The solvents were evaporated under vacuum and the residue, in benzene solution, was filtered through a column of alumina (100 g.) to give 6-chloro-11β-hydroxy-3-methoxy-16-(3'-oxobutyl)androsta-3,5-dien-17-one.

A solution of the foregoing product (1 g.) and potassium hydroxide (2 g.) in water (15 ml.) and ethanol (15 ml.) was refluxed under nitrogen for 1 hour. The solution was cooled, the precipitated solid was collected, and its solution in methanol (50 ml.) was treated with hydrochloric acid (2 ml.) at room temperature overnight. Dilution with water and crystallisation of the product from aqueous methanol gave 6α-chloro-11β-hydroxypentara-4,17(20)-diene-3,21-dione as needles, M.P. 222.5° C., $[\alpha]_D^{25}$ +39° (c., 1.0 in chloroform), $\lambda_{max.}^{EtOH}$ 236 mμ (ε 30,000)

EXAMPLE 25

Preparation of 11β-hydroxy-3-methoxypentara-3,5,17(20)-trien-21-one

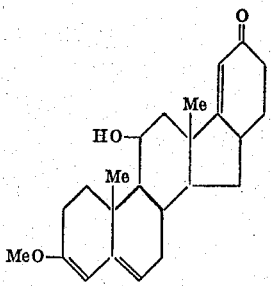

A mixture of sodium methoxide (from 5 g. of sodium), ethyl formate (10 ml.), 11β-hydroxy-3-methoxyandrosta-3,5-dien-17-one (12 g.) and benzene (100 ml.) was stirred under nitrogen for 1 hour at room temperature and then refluxed for 1 hour. Water was added to dissolve the precipitated solid and the benzene layer was separated. The aqueous layer was cautiously acidified with acetic acid and the precipitated 11β-hydroxy-3-methoxy-16-formylandrosta-3,5-dien-17-one was collected, washed with water, dried, and used directly for the next stage.

A mixture of the foregoing compound (2 g.), pyridine (20 ml.), triethylamine (1 ml.) and freshly distilled methyl vinyl ketone (2.5 ml.) was kept overnight at room temperature in an atmosphere of nitrogen. The solvents were removed under reduced pressure and the residue was filtered through a column of alumina (50 g.) in benzene solution to yield 11β-hydroxy-3-methoxy-16-(3'-oxobutyl)-androsta-3,5-dien-17-one.

A solution of the foregoing product (1 g.) and potassium hydroxide (2.5 g.) in water (10 ml.) and ethanol (20 ml.) was heated under reflux for 1 hour. Dilution with water gave a solid which was crystallised from methylene chloride/methanol to give 11β-hydroxy-3-methoxypentara-3,5,17(20)-trien-21-one as needles, M.P. 217–220° C., $[\alpha]_D^{24}$ −247.7° (c., 0.95) (dioxan), $\lambda_{max.}$ 238.5 mμ (ε, 32,500).

EXAMPLE 26

Preparation of 3β-hydroxypentara-5,17(20)-dien-21-one

A mixture of 3β-hydroxyandrost-5-en-17-one (4.5 g.), sodium methoxide (from 2 g. of sodium), dimethyl oxalate (4.00 g.) and benzene (50 ml.) was stirred at room temperature for 2 hours then allowed to stand at room temperature overnight. The reaction mixture was diluted with water, extracted with ether, and the aqueous phase acidified with dilute sulphuric acid. The precipitated 3β-hydroxy-16-methoxyoxalylandrost - 5 - en - 17 - one (IV; R'=CO₂Me) was filtered, washed with water, dried and used without purification for the next reaction.

A mixture of the foregoing oxalyl derivative (4.00 g.), methyl vinyl ketone (4.0 ml.), triethylamine (2.0 ml.) and pyridine (40 ml.) was stirred at room temperature overnight under an atmosphere of N₂. Evaporation of the solvents under reduced pressure gave a gummy residue which was dissolved in benzene and chromatographed on alumina to give 3β-hydroxy-16-(3'-oxobutyl)-androst-5-en-17-one, identical with that prepared in Example 1.

The 3β-hydroxy-16-(3'-oxobutyl)-androst-5-en-17-one was then converted to 3β-hydroxypentara-5,17(20)-dien-21-one in the manner described in Example 1.

We claim:

1. A process for the preparation of pentacyclic steroids having the partial formula

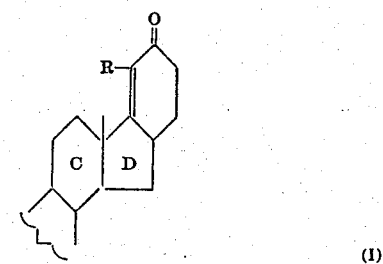

where R is selected from the group consisting of hydrogen, an alkyl group containing up to 6 carbon atoms and an aryl group, said process comprising condensing a 16-substituted 17-oxo steroid of partial formula

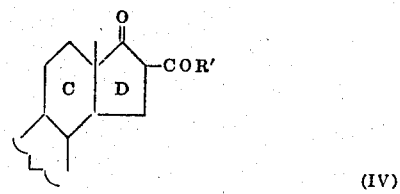

in which R' is selected from the group consisting of H and CO₂Alk with a reagent having the formula

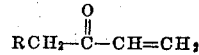

where R has the same meaning as above, under basic conditions to yield a 16-(3'-oxoalkyl)-17-oxo steroid having the partial structure

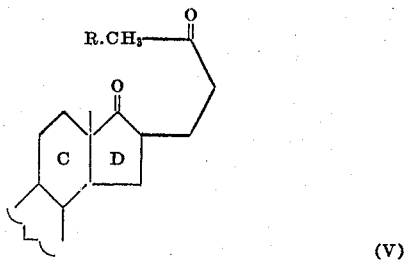

where R has the same meaning as above, and reacting the intermediate with a strong basic reagent to effect cyclisation.

2. A process as claimed in claim 1 wherein the 16-substituted 17-oxo steroid (IV) in an inert solvent is reacted with methyl vinyl ketone in the presence of an amine selected from the group consisting of trimethylamine and triethylamine to yield the 16-(3'-oxoalkyl)-17-oxo steroid (V).

3. A process as claimed in claim 2 wherein the reaction is carried out in an inert atmosphere and at a temperature between 0° to 50° C.

4. A process as claimed in claim 1 wherein the 16-(3'-oxoalkyl)-17-oxo steroidal intermediate (V) is reacted with a 10% solution of an alkali hydroxide selected from the group consisting of sodium and potassium hydroxide in aqueous ethanol.

5. A process as claimed in claim 4 wherein the reaction is carried out in an inert atmosphere at the refluxing temperature of the mixture and a reaction time of ½ to 6 hours.

6. 3β-hydroxypentara-5,17(20)-dien-21-one.
7. 3β-acetoxypentara-5,17(20)-dien-21-one.
8. Pentara-4,17(20)-dien-3,21-dione.
9. 3β-hydroxy-6-methylpentara-5,17(20) - dien - 21-one.
10. 3β-acetoxy-6-methylpentara-5,17(20) - dien - 21-one.
11. 6α-methylpentara-4,17(20)-diene-3,21-dione.
12. 11β-hydroxypentara-4,17(20)-diene-3,21-dione.
13. Pentara-4,17(20)-diene-3,11,21-trione.
14. 11α-hydroxypentara-4,17(20)-diene-3,21-dione.
15. 3-methoxypentara-3,5,17(20)-trien-21-one.
16. 3β-hydroxy-20-methylpentara-5,17(20) - dien - 21-one.
17. 2α-methylpentara-4,17(20)-diene-3,21-dione.
18. 4-methylpentara-4,17(20)-diene-3,21-dione.
19. 6-fluoro-3β-hydroxypentara-5,17(20) - dien - 21-one.
20. 3-methoxy-6-methylpentara-3,5,17(20) - trien - 21-one.
21. 6-dimethylaminomethyl-3-methoxypentara - 3,5,17(20)-trien-21-one.
22. 3β-hydroxypentara-5,9(11),17(20)-trien-21-one.
23. 3-methoxy-19-norpentara-1,3,5(10),17(20) - tetraen-21-one.
24. Petara-1,4,17(20)-triene-3,21-dione.
25. 11β-hydroxypentara-1,4,17(20)-triene-3,21-dione.
26. 11β-hydroxypentara-4,6,17(20)-triene-3,21-dione.
27. 3α,11β-dihydroxy-5β-pentar-17(20)-en-21-one.
28. 3β,11β-dihydroxy-5α-pentar-17(20)-en-21-one.
29. 11β-hydroxy-5β-pentar-17(20)-ene-3,21-dione.
30. 11β-hydroxy-5α-pentar-17(20)-ene-3,21-dione.
31. 6-formyl-11β-hydroxy - 3 - methoxypentara-3,5,17(20)-trien-21-one.
32. 6-cyano-11β-hydroxy - 3 - methoxypentara - 3,5, 17(20)-trien-21-one.
33. 6α-chloro-11β-hydroxypentara - 4,17(20) - diene-3,21-dione.
34. 11β-hydroxy-3-methoxypentara - 3,5,17(20)-trien-21-one.

35. A compound having the formula

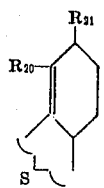

wherein
$R_{20}$ is hydrogen or lower alkyl, $R_{21}$ is oxo, oximo, hydroxy or lower alkanoyloxy, and S is a steroid nucleus selected from the following:

(a)
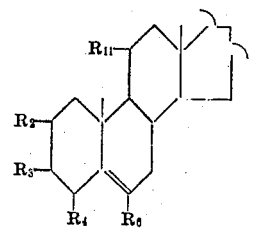

(b)
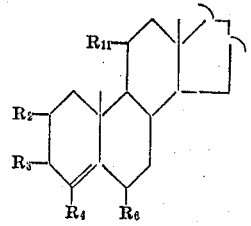

(c)
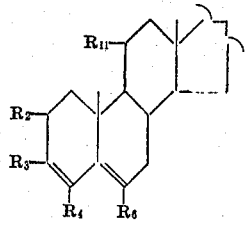

(d)
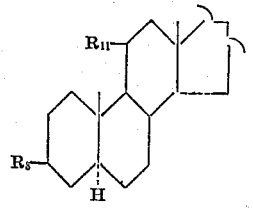

(e)
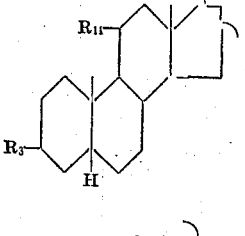

(f)
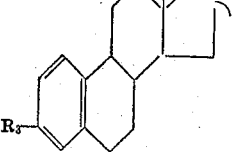

wherein
$R_2$ is hydrogen or α-methyl,
$R_3$ in (a) is hydroxyl, lower alkanoyloxy, or 3,3-lower alkylene dioxy, in (b) is oxo, in (c) and (f)

is lower alkoxy, in (*d*) is β-hydroxy or oxo and in (*e*) is α-hydroxy or oxo, $R_4$ is hydrogen or methyl, $R_6$ in (*a*) and (*b*) is hydrogen, lower alkyl, or halogen and in (*c*) is hydrogen, formyl, —$CH_2N(CH_3)_2$, or —CH, and $R_{11}$ is hydrogen, α-hydroxyl, β-hydroxyl, or oxo, and (*g*) the corresponding 1-dehydro derivatives of (*a*) and (*b*), (*h*) the corresponding 6-dehydro derivatives of (*b*), and (*i*) the corresponding 9(11)-rehydro derivatives of (*a*) and (*b*) except where $R_{11}$ is oxo.

References Cited by the Examiner

UNITED STATES PATENTS 3,178,459　4/1965　Pike _____ 260—397.4

OTHER REFERENCES

Nasipuri et al.: J. Chem. Soc., August 1961, pp. 3361–3366.

LEWIS GOTTS, *Primary Examiner.*

JOHNNIE R. BROWN, *Assistant Examiner.*